United States Patent
Bulan et al.

(10) Patent No.: US 9,442,176 B2
(45) Date of Patent: *Sep. 13, 2016

(54) BUS LANE INFRACTION DETECTION METHOD AND SYSTEM

(71) Applicant: Xerox Corporation, Norwalk, CT (US)

(72) Inventors: Orhan Bulan, Henrietta, NY (US); Edgar A. Bernal, Webster, NY (US); Robert P. Loce, Webster, NY (US)

(73) Assignee: Xerox Corporation, Norwalk, CT (US)

(*) Notice: Subject to any disclaimer, the term of this patent is extended or adjusted under 35 U.S.C. 154(b) by 68 days.

This patent is subject to a terminal disclaimer.

(21) Appl. No.: 14/068,503

(22) Filed: Oct. 31, 2013

(65) Prior Publication Data

US 2015/0117704 A1    Apr. 30, 2015

(51) Int. Cl.
| | |
|---|---|
| G01S 3/786 | (2006.01) |
| G08G 1/017 | (2006.01) |
| G08G 1/0967 | (2006.01) |
| G06T 7/20 | (2006.01) |

(52) U.S. Cl.
CPC ............ *G01S 3/7864* (2013.01); *G06T 7/20* (2013.01); *G06T 7/2013* (2013.01); *G06T 7/2033* (2013.01); *G06T 7/2066* (2013.01); *G08G 1/0175* (2013.01); *G08G 1/096716* (2013.01); *G08G 1/096741* (2013.01); *G08G 1/096783* (2013.01); *G06T 2207/30236* (2013.01)

(58) Field of Classification Search
None
See application file for complete search history.

(56) References Cited

U.S. PATENT DOCUMENTS

| | | | | |
|---|---|---|---|---|
| 6,728,317 | B1* | 4/2004 | Demos | 375/240.21 |
| 8,265,158 | B2* | 9/2012 | Rossignol et al. | 375/240.16 |
| 2004/0252193 | A1* | 12/2004 | Higgins | 348/149 |
| 2009/0207046 | A1* | 8/2009 | Arrighetti | 340/937 |
| 2009/0231314 | A1* | 9/2009 | Hanaoka et al. | 345/208 |
| 2012/0007983 | A1* | 1/2012 | Welch | 348/148 |
| 2012/0148092 | A1* | 6/2012 | Ni et al. | 382/103 |
| 2012/0235805 | A1* | 9/2012 | Nogami et al. | 340/441 |
| 2013/0028481 | A1* | 1/2013 | Wu | 382/105 |
| 2014/0195138 | A1* | 7/2014 | Stelzig et al. | 701/119 |

OTHER PUBLICATIONS

M Kiesling and M Ridgway, "Effective Bus-Only Lanes," ITE Journal, vol. 76, Issue 7, pp. 24-29, Jul. 2006.*
U.S. Appl. No. 13/463,769, filed May 3, 2012, Fan et al.
U.S. Appl. No. 13/613,174, filed Sep. 13, 2012, Bernal et al.
U.S. Appl. No. 13/600,742, filed Aug. 31, 2012, Bernal et al.
U.S. Appl. No. 13/453,245, filed Apr. 23, 2012, Bernal et al.
U.S. Appl. No. 13/914,752, filed Jun. 11, 2013, Bulan et al.
Robert Verkaik, The Independent, "Bus Lanes and the Law", UK, Mar. 14, 2006, 2 pages.
http://www.nyc.gov/html/dof/html/parking/park_tickets_violations.shtml, 4 pages.
Kiesling, Michael, Ridgway, Matthew, (2006), Effective Bus-Only Lanes. ITE Journal, vol. 76, Issue 7, 12 pages.

(Continued)

*Primary Examiner* — Matthew Bella
*Assistant Examiner* — Soo Shin
(74) *Attorney, Agent, or Firm* — Fay Sharpe LLP

(57) ABSTRACT

This disclosure provides methods and systems for form a trajectory of a moving vehicle captured with an image capturing device. According to one exemplary embodiment, a method forms a trajectory of a moving vehicle and determines if the vehicle is moving in one of a permitted manner and an unpermitted manner relative to the appropriate motor vehicle lane restriction laws and/or regulations.

23 Claims, 16 Drawing Sheets

(56) References Cited

OTHER PUBLICATIONS

Beal et al., High-Definition Video over IP, 2010, 4 pages.
Iain E. Richardson, The H.264 Advanced Video Compression Standard, , 349 pages, 2010, Second Edition.
B. K. P. Horn and B. G. Schunck, "Determining Optical Flow," Artificial Intelligence 17 (1981): pp. 185-203.
Huang et al., "Survey on Block Matching Motion Estimation Algorithms and Architectures with New Results," Journal of VLSI Signal Processing Systems 42, 24 pages, (2006).
Z. Zhang, "A flexible new technique for camera calibration," IEEE Trans. On Pattern Analysis and Machine Intelligence, vol. 22(11), pp. 1330-1334 (2000).
http://ladot.lacity.org/WhatWeDo/Operations/Neighborhood Services/TrucksonResidentialStreets/index.htm; printed Oct. 3, 2013.
http://vatruckweb.vdot.virginia.gov/VaTruckRestrictions.aspx, printed Jul. 18, 2013, 1 page.
http://www.cotrip.org/roadConditions.htm; printed Jul. 18, 2013, 2 pages.
http://en.wikipedia.org/wiki/Template_matching, 5 pages, printed Jul. 18, 2013.
Mo et al., "A Joint Sparsity Model for Video Anomaly Detection", Nov. 7, 2012, 27 pages.

\* cited by examiner

BUS LANE INFRACTION DETECTION METHOD AND SYSTEM

CROSS REFERENCE TO RELATED PATENTS AND APPLICATIONS

U.S. patent application Ser. No. 13/613,174, filed Sep. 13, 2012, by Edgar A. Bernal et al., entitled "METHOD FOR STOP SIGN LAW ENFORCEMENT USING MOTION VECTORS IN VIDEO STREAMS", and U.S. patent application Ser. No. 13/914,752, filed Jun. 11, 2013, by Orhan Bulan et al., entitled "METHOD AND SYSTEMS OF CLASSIFYING A VEHICLE USING MOTION VECTORS", are incorporated herein by reference in their entirety.

BACKGROUND

This disclosure relates to methods and systems to automatically form a trajectory of a moving vehicle captured with an image capturing device. Specifically, the disclosure provides methods and systems to automatically detect a restricted lane infraction within a compressed video stream, such as a bus-only lane infraction by a non-bus vehicle, such as an automobile.

Bus-only lanes are implemented around the world to reduce traffic congestion and fuel consumption in many metropolitan cities. See Kiesling, Michael, Ridgway, Matthew, (2006), "Effective Bus-Only Lanes", ITE Journal, Volume 76, Issue 7, 12 pages. The goal of bus lanes is to make public transportation faster and more preferable to get more people to use public transportation, which in return, will reduce traffic congestion.

Even though bus lanes are commonly implemented in several big cities, they often fail to provide many of the anticipated transit service benefits because the efficient operation of bus-only lanes is spoiled by violators. According to the San Francisco Transportation Authority, for example, "along the transit lanes in the Civic Center area on Market Street, over one-quarter of the vehicles on the street are violating the bus-only lane during the day, with over 60% of the vehicles violating the outbound bus-only lane in the pm peak hour. See Kiesling, Michael, Ridgway, Matthew, (2006), "Effective Bus-Only Lanes", ITE Journal, Volume 76, Issue 7, 12 pages. While the report notes that boarding time for the buses is the most significant cause for delay, the violation of the bus-only lanes keeps buses from accessing the boarding islands, causing them to wait more than one cycle at many signals to cross each intersection." See Kiesling, Michael, Ridgway, Matthew, (2006), "Effective Bus-Only Lanes", ITE Journal, Volume 76, Issue 7, 12 pages.

According to the San Francisco Transportation Authority, the bus-lane violations most frequently occur during the peak afternoon hours, which makes the transit travel and public transportation not any better in the rush hours.

In order to enable the desired/intended operation of bus-only lanes, enforcement of bus-lane regulation is very important. In cities where bus lanes are successfully implemented and operating as desired, enforcement of the regulation is rigidly ensured. See Kiesling, Michael, Ridgway, Matthew, (2006), "Effective Bus-Only Lanes", ITE Journal, Volume 76, Issue 7, 12 pages. Detection of bus lane infractions has been traditionally performed manually by traffic law enforcement officers or through the use of video cameras, e.g., CCTV. In the latter, an operator watches the recorded video and notifies the enforcing authority when a contravention is observed. See http://www.independent.co.uk/life-style/motoring/features/bus-lanes-and-the-law-469783.html. Both of these manual methods, however, are expensive in terms of operator costs. In London, for example, 19 million dollars were spent for bus-lane enforcement over three years, which constitutes 20% of the total cost spent to generate the entire bus-lane infrastructure in the city. See Kiesling, Michael, Ridgway, Matthew, (2006), "Effective Bus-Only Lanes", ITE Journal, Volume 76, Issue 7, 12 pages.

For the reasons discussed above, automated enforcement of bus-lane infractions is highly desirable to reduce operation costs, as well as reducing traffic congestion by providing a more efficient manner of enforcing bus-lane infractions by making public transportation faster and more preferable to travelers. Though desired, this problem is also challenging because not all non-bus vehicles in a bus-only lane are violators. There are exceptions where a non-bus vehicle is permitted to drive in a bus-only lane for short distances. An exception that is common in many cities is for a non-emergency non-bus vehicle to be permitted to use a bus-lane to make a next available right turn at an upcoming driveway or an intersection. This is illustrated in FIG. 1 where the lane including a diamond sign is the bus-only lane and non-bus vehicles are permitted to use the bus-lane to make a right turn at the intersection. Another common exception is that a non-emergency non-bus vehicle can drive in a bus line to make a quick drop off or pick up of a passenger(s).

Note that the presently described methods and systems in this disclosure focus on detection of violators. Actual law enforcement requires several additional considerations. For example, automated issuing of tickets would require vehicle identification, which can be achieved with LPR (License Plate Recognition) commonly used in numerous transportation imaging applications including enforcement for red lights, speed, parking, etc. Another use of the presently disclosed detection methods and systems includes alerting local law enforcement to stop an identified vehicle. Yet another use is monitoring traffic conditions so that trends of violation can be detected and suitable signage or enforcement capabilities can be put into place.

INCORPORATION BY REFERENCE

U.S. patent application Ser. No. 13/463,769, filed May 3, 2012, by Fan et al., entitled "TIRE DETECTION FOR ACCURATE VEHICLE SPEED ESTIMATION";

U.S. patent application Ser. No. 13/613,174, filed Sep. 13, 2012, by Bernal et al., entitled "METHOD FOR STOP SIGN LAW ENFORCEMENT USING MOTION VECTORS IN VIDEO STREAMS";

U.S. patent application Ser. No. 13/600,742, filed Aug. 31, 2012, by Bernal et al., entitled "VIDEO-BASED VEHICLE SPEED ESTIMATION FROM MOTION VECTORS IN VIDEO STREAMS";

U.S. patent application Ser. No. 13/453,245, filed Apr. 23, 2012, by Bernal et al., entitled "VEHICLE COUNTING METHODS AND SYSTEMS UTILIZING COMPRESSED VIDEO STREAMS";

U.S. patent application Ser. No. 13/914,752, filed Jun. 11, 2013, by Bulan et al., entitled "METHOD AND SYSTEMS OF CLASSIFYING A VEHICLE USING MOTION VECTORS";

Verkaik, Robert, The Independent, "Bus Lanes and the Law", UK, Mar. 14, 2006, 2 pages;

http://www.nyc.gov/html/dof/html/parking/park_tickets_violations.shtml, 4 pages;

Kiesling, Michael, Ridgway, Matthew, (2006), "Effective Bus-Only Lanes", ITE Journal, Volume 76, Issue 7, 12 pages;

"High-Definition Video over IP", Beal et al., 2010, 4 pages;

"The H.264 Advanced Video Compression Standard", Iain E. Richardson, 349 pages, 2010, Second Edition;

"Determining Optical Flow", B. K. P. Horn and B. G. Schunck, Artificial Intelligence 17 (1981): pages 185-203;

"Survey on Block Matching Motion Estimation Algorithms and Architectures with New Results", Huang et al., Journal of VLSI Signal Processing Systems 42, 24 pages, (2006);

Z. Zhang, "A flexible new technique for camera calibration", IEEE Trans., On Pattern Analysis and Machine Intelligence, Vol. 22(11), pages 1330-1334 (2000);

http://ladot.lacity.org/tf_Trucks_on_Residential_Streets.htm; printed 7-18-2013;

http://vatruckweb.vdot.virginia.gov/VaTruckRestrictions.aspx, printed 7-18-2013, 1 page;

http://www.cotrip.org/roadConditions.htm; printed 7-18-2013, 1 page;

http://en.wikipedia.org/wiki/Template_matching, 5 pages, printed 7/18/2013; and

"A Joint Sparsity Model For Video Anomaly Detection", Nov. 7, 2012, Mo et al., 27 pages, are all incorporated herein by reference in their entirety.

BRIEF DESCRIPTION

In one embodiment of this disclosure, described is a computer implemented method of estimating a trajectory of a moving vehicle captured with an image capturing device and determining if the moving vehicle is moving in one of a permitted manner and an unpermitted manner, the image capturing device oriented to include a field of view spanning a vehicle detection target region, the method comprising: a) acquiring a first set of motion vectors based on a plurality of frames captured with the image capturing device, the first set of motion vectors including a coherent cluster of motion vectors representative of the moving vehicle detected within the vehicle detection target region at a first location; b) acquiring a second set of motion vectors based on the plurality of frames captured with the image capturing device, the second set of motion vectors including a coherent cluster of motion vectors representative of the moving vehicle detected within the vehicle detection target region at a second location different from the first location; c) estimating a trajectory of the moving vehicle detection within the vehicle detection target region based on the first location and the second location and d) analyzing the estimated trajectory of the moving vehicle to determine if the moving vehicle is moving in one of the permitted manner and the unpermitted manner.

In another embodiment of this disclosure, described is an image processing system comprising: an image capturing device oriented to include a field of view spanning a vehicle detection target region, and an image processor operatively associated with the image capturing device, the image processor configured to perform a method of estimating a trajectory of a moving vehicle captured with the image capturing device and determining if the moving vehicle is moving in one of a permitted manner and an unpermitted manner, the method comprising: a) acquiring a first set of motion vectors based on a plurality of frames captured with the image capturing device, the first set of motion vectors including a coherent cluster of motion vectors representative of the moving vehicle detected within the vehicle detection target region at a first location; b) acquiring a second set of motion vectors based on the plurality of frames captured with the image capturing device, the second set of motion vectors including a coherent cluster of motion vectors representative of the moving vehicle detected within the vehicle detection target region at a second location different from the first location; c) estimating a trajectory of the moving vehicle detection within the vehicle detection target region based on the first location and the second location; and d) analyzing the estimated trajectory of the moving vehicle to determine if the moving vehicle is moving in one of the permitted manner and the unpermitted manner.

In still another embodiment of this disclosure, described is a computer implemented method of detecting a moving vehicle violation of a motor vehicle lane restriction, the moving vehicle captured with an image capturing device, the image capturing device oriented to include a field of view spanning a vehicle detection target region, the method comprising: a) acquiring compressed video of a moving vehicle captured with the image capturing device, the compressed video including compression type motion vectors representing movement of the moving vehicle; b) classifying the moving vehicle as one or more of a large size vehicle, a relatively small size vehicle, a truck, a bus, a non-bus vehicle, a passenger vehicle and a motorcycle; c) estimating a trajectory of the moving vehicle based on a track of the moving vehicle represented as a plurality of temporal spaced coherent clusters of motion vectors associated with the moving vehicle; and d) analyzing the moving vehicle classification and the estimated trajectory to determine if the moving vehicle is in violation of the motor vehicle lane restriction.

BRIEF DESCRIPTION OF THE DRAWINGS

FIG. 6 illustrates a reference frame including a reference block and a search window and FIG. 7 illustrates a target frame including a target block, i.e. motion block.

FIG. 7 is a reference frame; FIG. 8 is a target frame; FIG. 9 is a resulting motion vector field; and FIG. 10 is a predicted frame.

FIG. 12 is a reference frame; FIG. 13 is a target frame; FIG. 14 is a resulting motion vector field; and FIG. 15 is a resulting binary image showing active motion blocks.

FIG. 17 shows the original video frames including a vehicle; FIG. 18 shows the corresponding dots indicating the centroid of the active motion vector clusters; FIG. 19 shows the tracked centroid dots on an image plane associated with the initial frame shown in FIG. 17.

FIG. 20 shows the original video including a moving vehicle crossing an intersection; and FIG. 21 shows the trajectory of the moving vehicle calculated using compression-type motion vectors.

FIG. 22 shows the original video including a moving vehicle making a right turn and FIG. 23 shows the trajectory of the moving vehicle calculated using compression type motion vectors.

DETAILED DESCRIPTION

Figure 1:
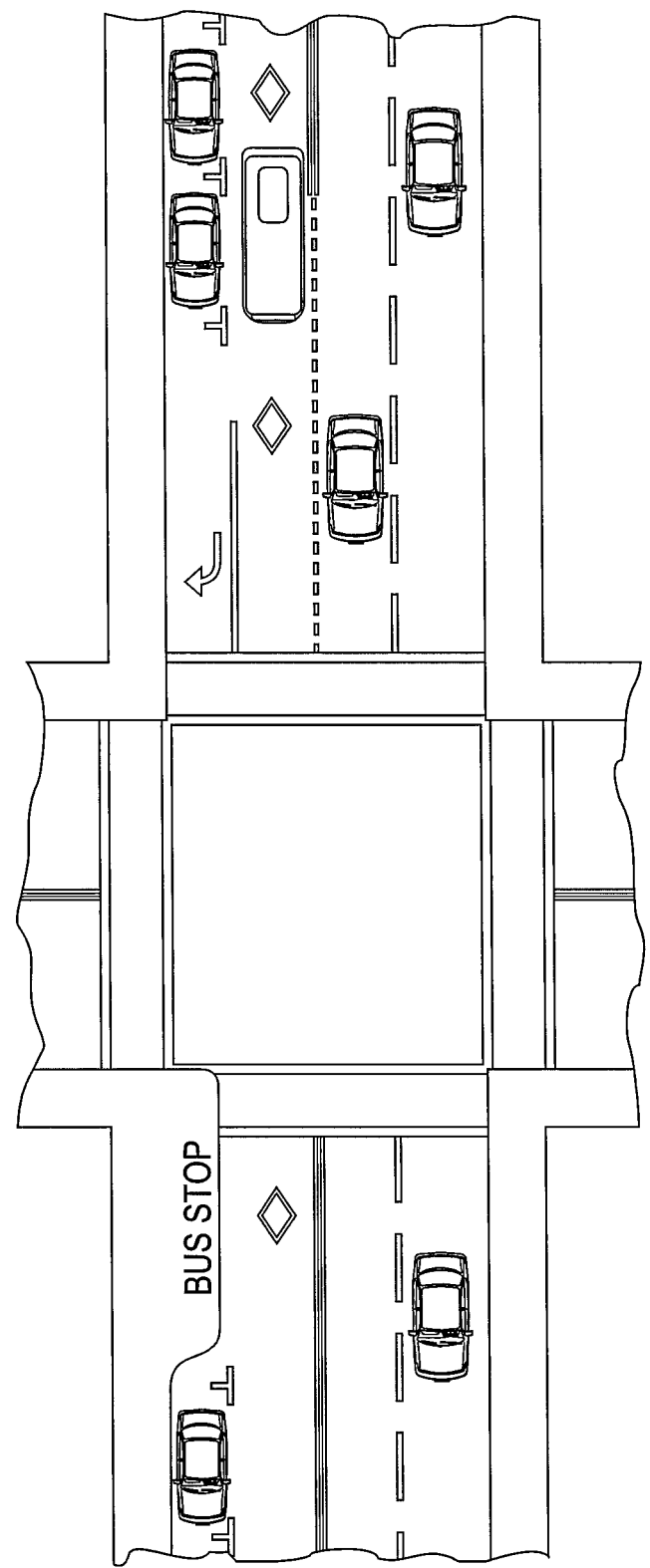
FIG. 1 is a diagram of a plurality of traffic lanes including a bus-only lane.

This disclosure and the exemplary embodiments herein provide a method and system of estimating a trajectory of a moving vehicle captured in a plurality of frames associated with an image processing system. In addition, this disclosure provides a method and system of utilizing the estimated trajectory of a moving vehicle and detecting if the moving vehicle is infracting a motor vehicle lane restriction, such as a bus-only lane restriction. It is to be understood that while the detailed description which follows focuses on detecting a bus lane infraction of a non-bus vehicle, other types of lane infractions are within the scope of this disclosure, as well as other types of motor vehicle laws infractions associated with moving vehicles in various jurisdictions. It is also to be understood that, for purposes of this disclosure, a non-bus vehicle includes one or more of a passenger car/truck, motorcycle, a commercial truck and/or any other non-emergency type non-bus vehicle. Furthermore, while the following description does not necessarily distinguish between an emergency/non-emergency type non-bus vehicle, additional processing steps, either manual and/or automatic may be used to determine if a potentially infracting non-bus vehicle is an emergency non-bus vehicle and thereby permitted to use the bus only lane without restriction.

Provided herein is a method and system for automated video-based bus lane infraction detection that can operate within a compression video stream. The method includes the following steps: (1) During an initialization step, determine the location of a virtual target area within a camera's field of view spanning a region of interest (ROI) typically performed at system installation or setup; (2) Capture video including the ROI. Alternatively, acquire compressed video that was previously captured; (3) Determine motion vectors from the incoming, live uncompressed video stream, where the vectors are the type used for video compression. Alternatively, if compressed video was acquired, extract motion vectors from the compressed data stream; (4) Detect the presence of a vehicle that moves across the virtual target area by analyzing the temporal persistence of clusters of the motion vectors; (5) Classify the detected vehicle into one of a bus or non-bus vehicle category, by analyzing a cluster of motion vectors, e.g., size or length of the clusters; (6) Track a detected non-bus vehicle across frames to identify non-bus vehicles that do not make a next available right turn from the bus lane, i.e., violators; (7) If a violation is detected, provide a signal of violation. The relevant information about the violation event may be embedded in the compressed video stream in the form of metadata; (8) (Optional) Frames that capture the start, middle or end of the violation event can be encoded as reference (I) frames, which are described below, to facilitate future searches or rapid retrieval of evidential imagery.

The use of bus lanes by non-bus vehicles is typically restricted by legislation in many states/cities. See http://www.independent.co.uk/life-style/motoring/features/bus-lanes-and-the-law-469783.html, http://www.nyc.gov/html/dof/html/parking/park_tickets_violations.shtml, and Kiesling, Michael, Ridgway, Matthew, (2006), "Effective Bus-Only Lanes", ITE Journal, Volume 76, Issue 7, 12 pages. In some New York cities, for example, emergency vehicles are the only non-bus vehicles allowed to drive in a bus lane during certain hours. All other non-bus vehicles may enter a bus-only lane to make the next available right turn, or to quickly drop off or pick up passengers. See http://www.nyc.gov/html/dof/html/parking/park_tickets_violations.shtml.

Detection of bus lane infractions has traditionally been performed manually by traffic law enforcement officers or through manual inspection of video captured with traffic or surveillance cameras such as CCTV (closed-circuit television). See http://www.independent.co.uk/life-style/motoring/features/bus-lanes-and-the-law-469783.html. In the latter case, an operator watches the recorded video and notifies the enforcing authority when an infraction is observed. As previously discussed, these current processes are labor intensive and prone to human error.

Figure 2:
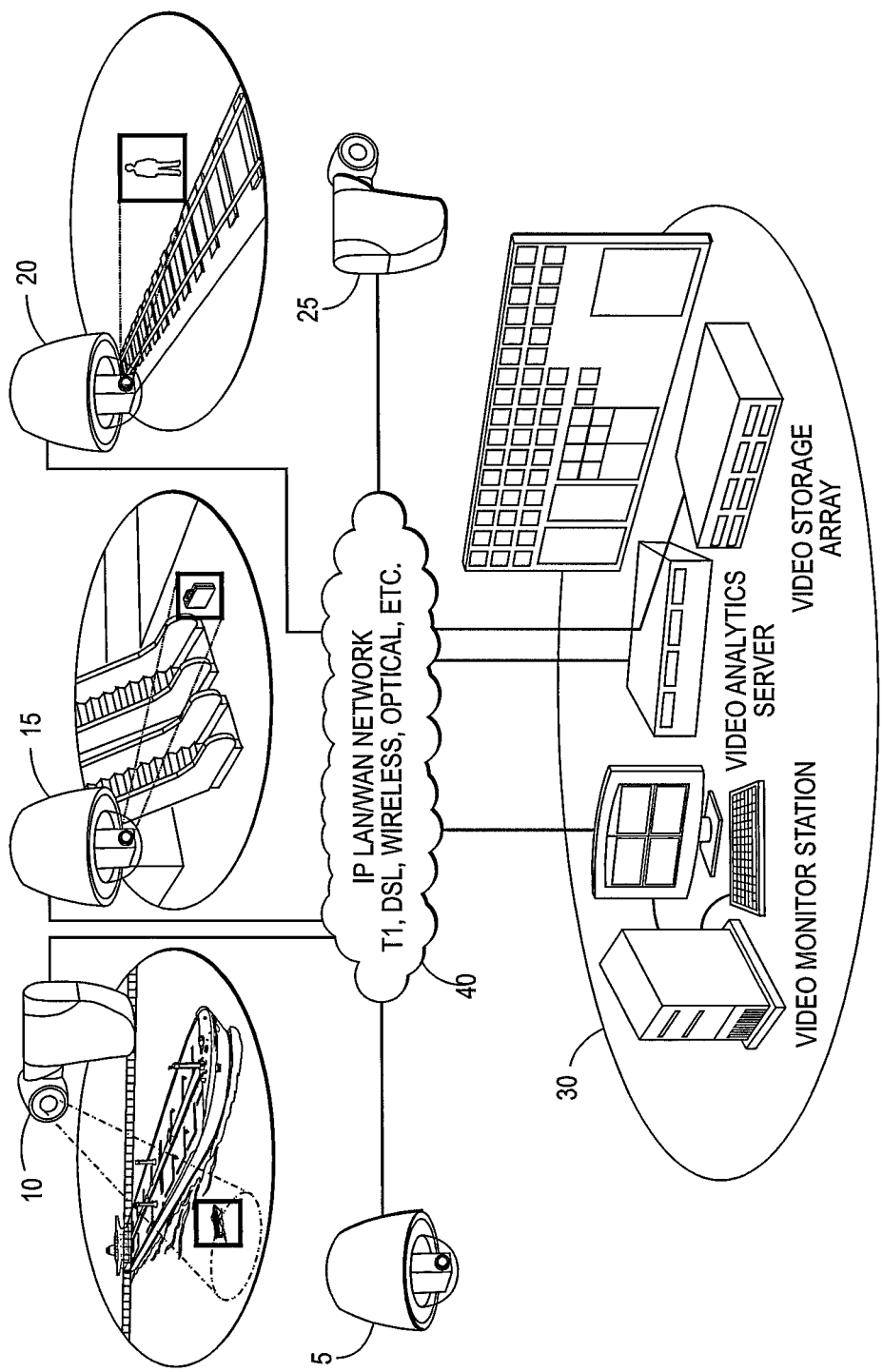
FIG. 2 illustrates a video camera network system.

Video compression is essential for image processing applications where high quality video transmission and/or archival is required. Consider a surveillance system depicted in FIG. 2, which is composed of a set of dome cameras 5, 10, 15, 20 and 25 that relay video data to a central processing and archival facility 30. While the communication network used to transport the video stream between the cameras and the central facility may be built on top of proprietary technology, traffic management centers have recently started to migrate to Internet Protocol- or IP-compliant networks 40.

Whichever be the case, the underlying communication network typically has bandwidth constraints which dictate the use of video compression techniques on the camera end, prior to transmission. In the case of legacy analog cameras, compression is performed at an external encoder attached to the camera, whereas digital cameras typically integrate the encoder within the camera itself. Typical transmission rates over IP networks require the frame rate of uncompressed multi-megapixel video streams to be limited to fewer than 5 frames per second (fps). The latest video compression standards enable the utilization of the full frame rate camera capabilities for transmitting high definition video at the same network bandwidth. See "High-Definition Video over IP", Beal et al. For example, transmission of 1080p HD (High-Definition) uncompressed video requires a bandwidth of 1.5 Gbps, while its compressed counterpart requires only 250 Mbps; consequently, transmission of compressed video with 6 times the frame rate of the uncompressed version is possible over the same network infrastructure. Note that fully automated law enforcement for bus-lane infraction requires vehicle identification, which can be achieved with LPR (License Plate Recognition). LPR typically operates on high resolution images/video which is typically compressed before transmission to meet bandwidth requirements. The methods and systems described herein for detection of violators are video compression compliant which provides computational efficiency.

Figure 3:
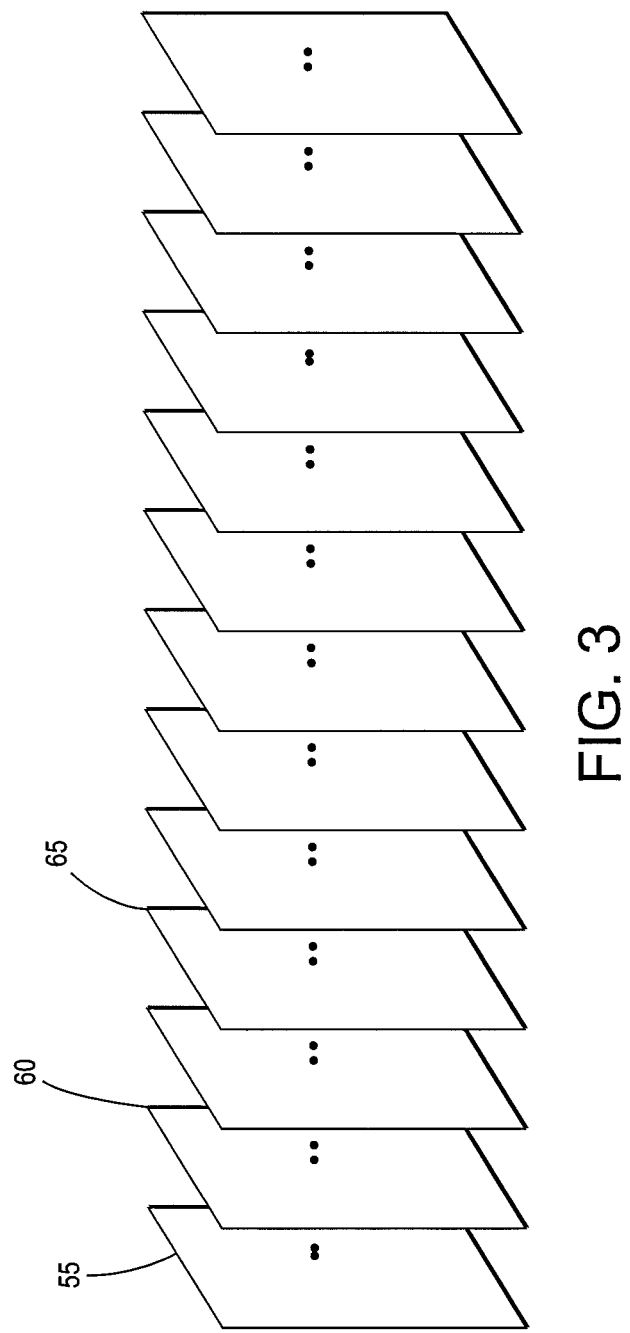
FIG. 3 is a diagram of a video compression technique used according to an exemplary embodiment of this disclosure, the diagram showing reference (I) and non-reference (B and P) frames.

Video compression is achieved by exploiting two types of redundancies within a video stream: spatial redundancies amongst neighboring pixels within a frame, and temporal redundancies between adjacent frames. This modus operandi gives rise to two different types of prediction, namely intra-frame and inter-frame prediction, which in turn result in two different types of encoded frames, reference and non-reference frames, as depicted in FIG. 3. Reference frames, or I-frames 55 are encoded in a standalone manner (intra-frame) using compression methods similar to those used to compress digital images. Compression of non-reference frames (P- and B-frames 60 and 65 respectively) entails using inter-frame or motion-compensated prediction methods where the target frame is estimated or predicted from previously encoded frames in a process that typically entails three steps (see "The H.264 Advanced Video Compression Standard", Iain E. Richardson): (i) motion estimation, where motion vectors are estimated using previously encoded frames. The target frame is segmented into pixel blocks called target blocks, and an estimated or predicted frame is built by stitching together the blocks from previously encoded frames that best match the target blocks. Motion vectors describe the relative displacement between the location of the original blocks in the reference frames and their location in the predicted frame. While motion compensation of P-frames relies only on previous frames, previous and future frames are typically used to predict B-frames; (ii) residual calculation, where the error between the predicted and target frame is calculated; and (iii) compression, where the error residual and the extracted motion vectors are compressed and stored.

For video captured with a stationary camera—the category under which most traffic cameras currently deployed fall—the main cause of changes between adjacent frames corresponds to object motion. In this setting the output from the motion compensation stage is the optical block flow describing the way pixel blocks move between adjacent frames. As such, the encoded set of motion vectors is a good descriptor of apparent motion of objects within the field of view of the camera.

The disclosed method and system for video-based bus lane infraction detection can operate within a compression video stream. The method and system uses motion vectors associated with video compression, which are calculated as one of the compression steps prior to archiving or transmission, or are readily available from the compressed data stream. Building bus lane infraction detection directly into the compression step adds a relatively small amount of computation which is conducive to real-time performance. This embedded embodiment of the method and system negates the need for further processing at a server, i.e., decompression, infraction detection and recompression. In another exemplary embodiment, the method and system is implemented in a central processor that has access to compressed video data including a target region. According to this embodiment, bus lane infraction detection is performed using decompression of only the motion vectors, rather than decompression of the complete video.

Notably, bandwidth savings can be achieved when bus-lane infraction detection is performed at a camera rather than a central server. In this scenario, bandwidth can be reduced by only transmitting images of interest, e.g., only the images when an infraction is detected to the central location for archival and evidentiary use. Alternatively, video frames containing violators may be encoded as reference frames to facilitate future video searches in case the full video feed is transmitted and stored.

Figure 4:
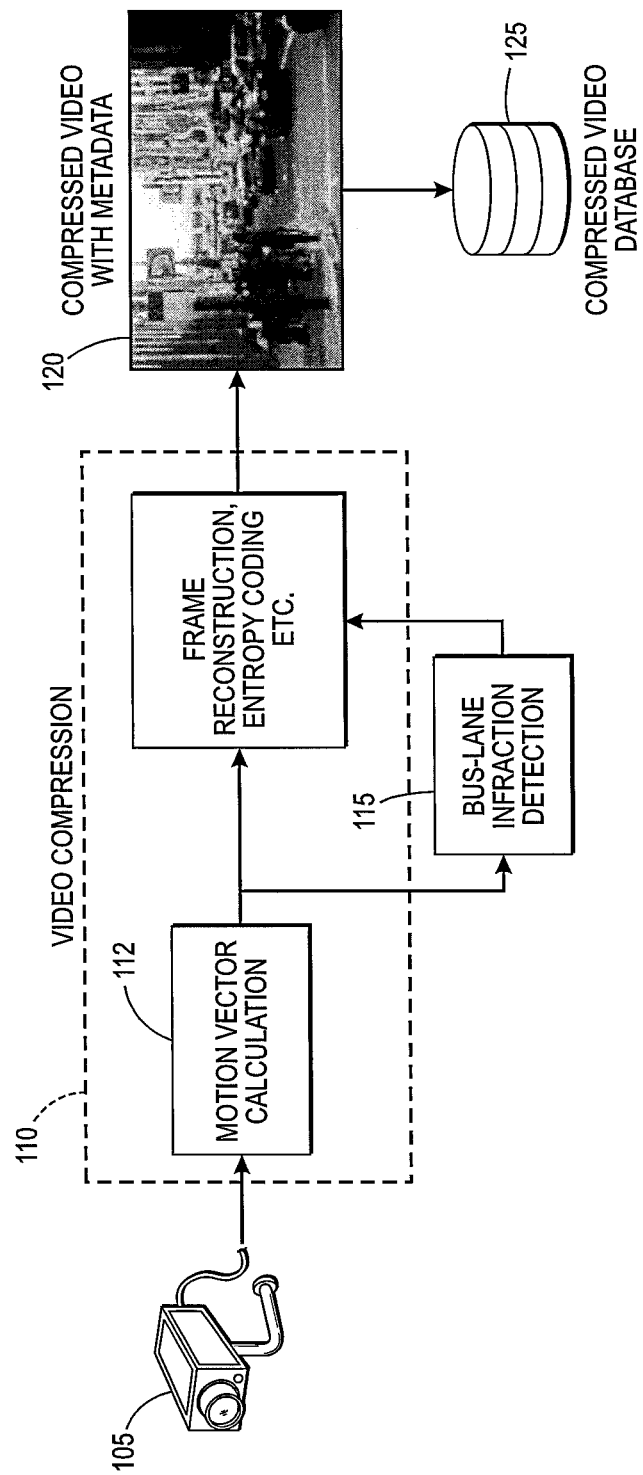
FIG. 4 is a block diagram of an image capturing system incorporating an inline process of detecting a moving vehicle violation of a motor vehicle lane restriction according to an exemplary embodiment of this disclosure.

A high-level overview of an exemplary online method of bus lane infraction detection is shown in FIG. 4. A traffic surveillance camera 105 captures video of the region of interest, typically a street or highway. Bus lane infraction detection is performed as a minor addition to the video compression process 110 as explained in more detail below. When a vehicle passing through the street is classified, the information regarding the bus lane infraction can be embedded in the compressed video stream 120 in the form of metadata which is stored in a database 125. Optionally, frames in which a vehicle is within the field of view of the camera can be encoded as reference frames to facilitate future searches.

Steps in the implementation of the system include:

Step 1) In an initialization step, determine the location of a virtual target area within a field of view of a camera, where the field of view spans a region of interest. This step is typically performed at system installation or setup.

Figure 5:
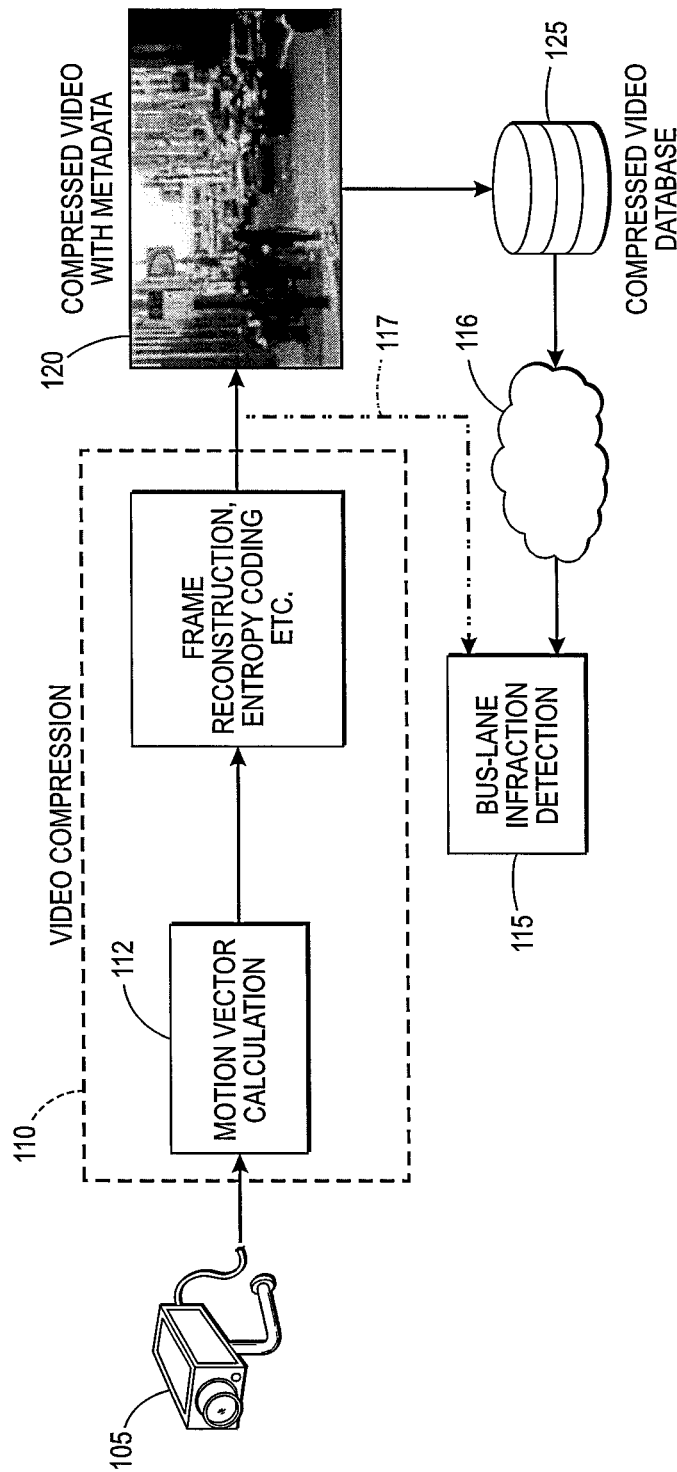
FIG. 5 is a block diagram of an image capturing system incorporating an offline process of detecting a moving vehicle violation of a motor vehicle lane restriction according to an exemplary embodiment of this disclosure.

Step 2) Capture video using the camera 105. Alternatively, acquire compressed video 125 over a network 116 that was taken with the camera 105 as shown in FIG. 5, i.e., offline.

Step 3) Determine motion vectors 112 from the incoming, live uncompressed video stream, where the vectors are the type used for video compression. Alternatively, if compressed video has been acquired as shown in FIG. 5, i.e., offline, the Bus-lane Infraction Detection 115 process extracts motion vectors from the compressed data stream which is shown being accessed over a network 116 from a compressed video database 125, however, could be accessed at the output of video compression process 110, indicated by dashed line 117.

Step 4) Detect the presence of a vehicle that moves across the virtual target area by processing the motion vectors. See U.S. patent application Ser. No. 13/613,174, filed Sep. 13, 2012, by Bernal et al., entitled "METHOD FOR STOP SIGN LAW ENFORCEMENT USING MOTION VECTORS IN VIDEO STREAMS".

Step 5) If a moving vehicle is detected in the virtual target area, classify the detected vehicle into one of bus or other non-bus vehicle category(ies). See U.S. patent application Ser. No. 13/914,752, filed Jun. 11, 2013, by Bulan et al., entitled "METHOD AND SYSTEMS OF CLASSIFYING A VEHICLE USING MOTION VECTORS".

Step 6) If the detected vehicle is a non-bus vehicle, track the non-bus vehicle to determine if it is making a right turn.

Step 7) If a violation is detected, provide a signal of violation. The relevant information about the violation event may be embedded in the compressed video stream in the form of metadata.

Step 8) (Optional) Frames that capture the start, middle or end of the violation event may be encoded as reference frames to facilitate future searches or rapid retrieval of evidentiary imagery.

The process provided relies on the processing of information conveyed by motion vectors, therefore the method and system can alternatively be executed on previously compressed video streams as shown in FIG. 5 without the need to fully decompress the video thus making it more computationally efficient than the naïve approach, which performs complex operations, e.g., background estimation, motion detection, tracking, feature extraction etc., on the fully decompressed video stream. In addition, the method and system provided here is also useful for processing of stored compressed video for historical data analysis, for example.

Implementation of the method and system described herein requires minor additional processing with respect to a video compression algorithm at the point of execution, for example an analog to digital converter in the case of analog cameras or digital IP cameras at the point of surveillance.

Described below are further details and explanations of steps 1)-8), provided above, of a method and system to automatically detect a bus lane infraction from compressed video streams, according to an exemplary embodiment of this disclosure.

Step 1) During an initialization step, determine the location of a virtual target area within a field of view of a camera, where the field of view spans a region of interest.

The region of interest may be the bus lane, and may include surrounding areas. The surrounding areas may be used for operations such as determining if a non-bus vehicle used the lane for turning. It may also be used to improve identification of vehicles by, for example, acquiring video images as the vehicle enters or exits the bus lane. Typical virtual target areas include, but are not limited to, single or multiple virtual polygons, usually one per monitored traffic lane. The location of the virtual target areas is typically input manually as it depends on the geometric configuration of the specific camera setup. The virtual polygon is used for both occlusion and vehicle detection.

Step 2) Capture video using the camera. Alternatively, acquire compressed video that was taken with the camera.

A conventional traffic camera or other video camera may be used for capturing live video. Implementation requires fewer modifications on IP cameras which perform embedded video compression compared to a camera that does not perform compression. Alternatively, the compressed video may be available from a video data base.

Step 3) Determine motion vectors from the incoming, live uncompressed video stream, where the vectors are the type used for video compression. Alternatively, acquire compressed video and extract motion vectors from the compressed data stream.

Standard implementations of video compression algorithms usually utilize fixed rates for reference or I-frame inclusion, typically on the order of one I-frame every 30 to 50 frames. Since I-frames don't have associated motion vectors, they aren't utilized for monitoring and detection purposes. Notably, exclusion of I-frame processing does not have a noticeable impact on car monitoring results since they represent a small minority of frames.

Motion vectors are extracted as part of the motion estimation stage in the compression process. While motion vectors comprehending the full video frame are computed at compression, it should be clear from the description of subsequent steps that processing of motion vectors located within the confines of the virtual target area is sufficient for robust monitoring of stoppage events. Following now is a brief description on how motion vectors are extracted. For example, see "The H.264 Advanced Video Compression Standard", by Iain E. Richardson.

Figure 6:
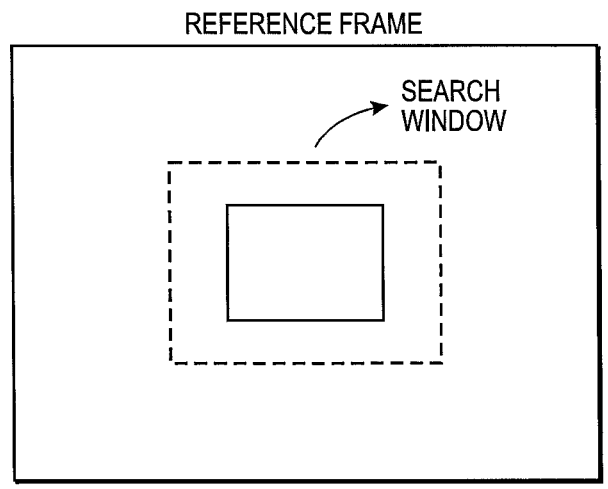
FIGS. 6 and 7 illustrate a block matching algorithm performed according to an exemplary embodiment of this disclosure.
Figure 7:
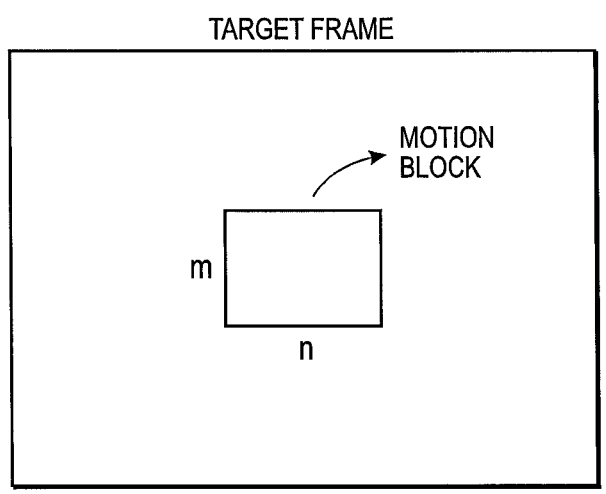

Although motion vectors between two adjacent frames in a video sequence can be extracted using a pixel-level optical flow method (see "Determining Optical Flow", by B. K. P. Horn and B. G. Schunck), which entails the calculation of motion vectors for each pixel in each non-reference frame and is thus highly computationally expensive, compression algorithms such as H264 and MPEG4 typically employ block-based approaches. For example, see "The H.264 Advanced Video Compression Standard", by Iain E. Richardson. Motion vectors in block-based approaches describe motion of matching blocks across adjacent frames and their computation requires significantly less computational resources when compared to pixel-level methods. FIGS. 6 and 7 depict a graphical description of a block matching algorithm.

Figure 8:
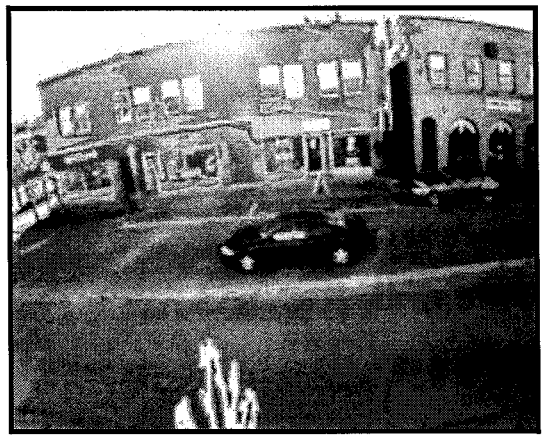
FIGS. 8, 9, 10 and 11 illustrate the results of a block-based motion estimation algorithm performed according to an exemplary embodiment of this disclosure.
Figure 9:
Figure 10:
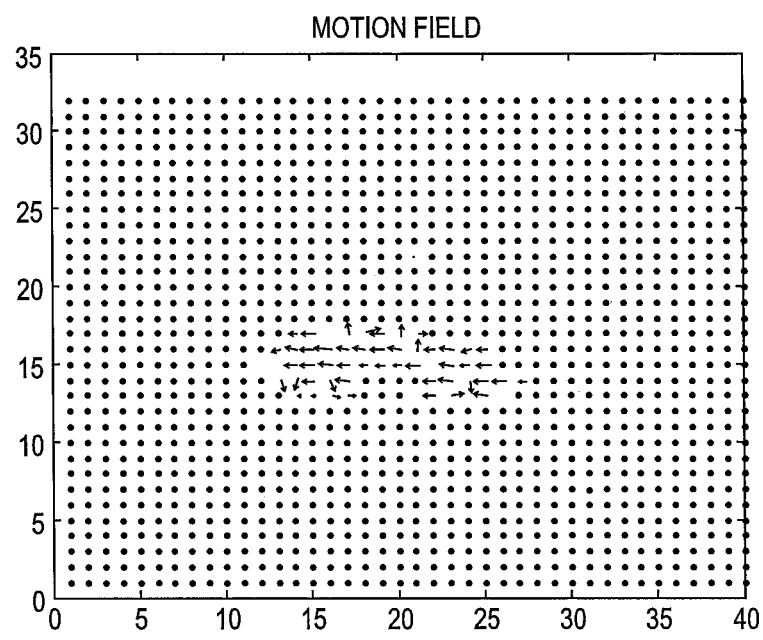
Figure 11:
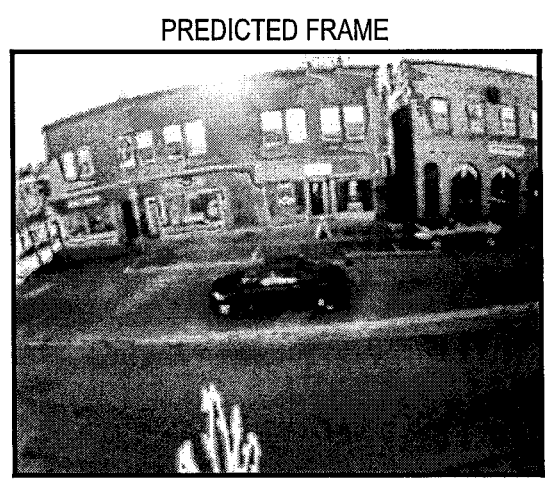
Figure 12:
FIGS. 12, 13, 14 and 15 are another illustration of the results of a block-based motion estimation algorithm performed according to an exemplary embodiment of this disclosure.
Figure 13:

The block matching algorithm breaks up the frame to be compressed, i.e. target frame, into pixel blocks of a predetermined size. Let us denote the size of a motion block by m×n pixels, where typically m=n=16 pixels. A search is performed in the reference frame for the block that is most similar to the current m×n target pixel block. Since searching and calculating similarity metrics is a computationally expensive process, a search window is typically defined in the around the location of the target motion block as shown in FIG. 6. Example similarity criteria between the blocks are the mean squared error (MSE) and the mean absolute difference (MAD), which are calculated as:

$$\text{MSE}(d_1,d_2)=\Sigma(B(k,l,j)-B(k+d_1,l+d_2,j-1))^2 \tag{1}$$

$$\text{MAD}(d_1,d_2)=\Sigma|B(k,l,j)-B(k+d_1,l+d_2,j-1)| \tag{2}$$

where $B(k,l,j)$ denotes the pixel located on the k-th row and k-th column of the m×n block of pixels in the j-th frame, and $(d_1,d_2)$ is the vector describing the displacement between the target and candidate blocks. In this case, the (j-1)-th frame is the already encoded frame being used as a reference frame, and the j-th frame is the target frame. Since both MSE and MAD measure how dissimilar two blocks are, a block similarity measure can then defined as the reciprocal or the negative MSE or MAD. The motion vector for the target pixel block is the vector $(d_1,d_2)$ that maximizes the block similarity measure between the target and reference blocks. The search for the best matching block in the search window can be conducted using a full extensive search, binary search, three step search, spiral search algorithms, etc. See "Survey on Block Matching Motion Estimation Algorithms and Architectures with New Results", Huang et al. FIG. 10 illustrates the motion field resulting from the application of an 8×8 pixel block-based motion estimation algorithm with a 16×16 pixel search to the reference frame depicted in FIG. 8 and the target frame from FIG. 9. FIG. 11 shows the predicted image that results from stitching together the best-matching reference blocks. In this scenario, the camera is fixed and the car is moving from right to left. As a consequence, all apparent movement is within the region where car is located on the image plane.

Step 4) Detect the presence of a vehicle that moves across the virtual target area by analyzing the computed motion vectors. For example, see U.S. patent application Ser. No. 13/453,245, filed Apr. 23, 2012, by Bernal et al., entitled "VEHICLE COUNTING METHODS AND SYSTEMS UTILIZING COMPRESSED VIDEO STREAMS".

Figure 14:
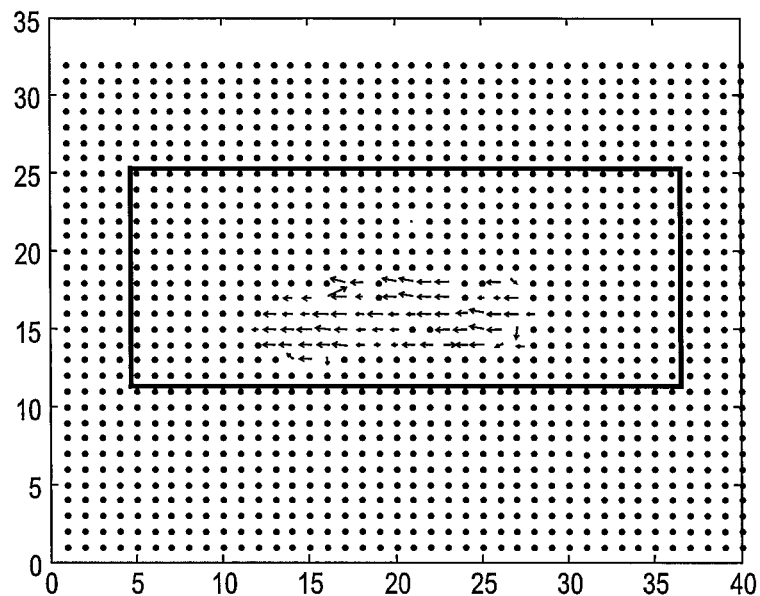
Figure 15:
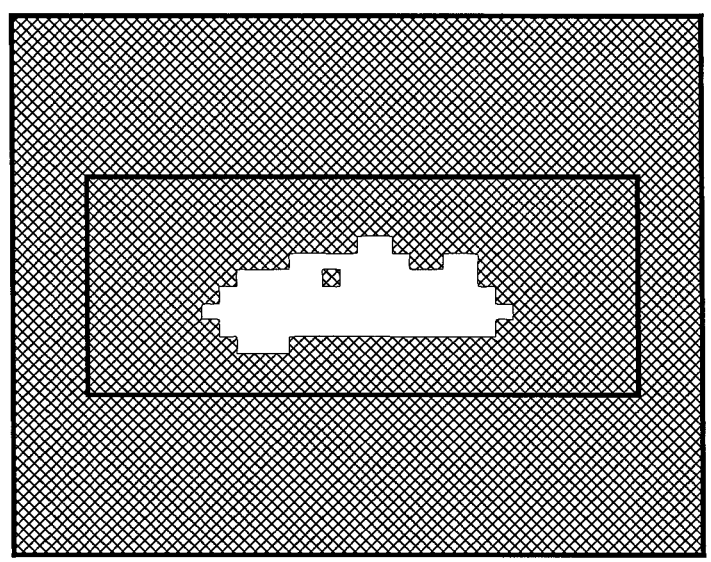

In order to avoid false positives due to fictitious sources of motion such as camera shake, moving leaves and clouds, water waves, etc., only motion vectors with a magnitude larger than a predetermined threshold T are considered. The motion blocks associated with such motion vectors are called active motion blocks and indicate the existence of a moving object in the area captured by the blocks. FIGS. 12-15 illustrates how knowledge of motion vectors for a given target frame can be used in conjunction with the location of the target virtual area in order to trigger a vehicle detection event. FIGS. 12-15 show two consecutive video frames, FIG. 12 and FIG. 13, and the corresponding motion vectors, FIG. 14 and the active motion blocks, FIG. 15. The motion vectors are calculated for 4×4 pixel blocks for illustration purposes only, as motion blocks used in compression are larger, typically 16×16 pixels and above. Superimposed on FIGS. 14 and 15 is a sample target virtual area indicated with an outline box, a virtual polygon that contains the road lane being monitored.

As a car moves across a virtual polygon, a number of active motion vectors will be located inside the polygon. In order to avoid false positives due to active motion vectors produced by apparent motion of objects different than cars, two thresholds are set: a threshold $N_1$ which defines the smallest connected cluster of active motion vectors inside the virtual polygon before a car detection be triggered, and a threshold $N_2$ which defines the smallest number of consecutive frames on which connected clusters having at least $N_1$ active motion vectors are inside the virtual polygon before a vehicle detection can be triggered.

The value of $N_1$ typically depends on the geometry of the camera setup, the size of the virtual polygon, the resolution of the video sequence as well as on the size of the blocks used in the motion estimation algorithm. The value of $N_2$ depends on the value of $N_1$, the geometry of the camera setup, the size of the virtual polygon, the frame rate and the average speed of the road being monitored. A vehicle detection event is triggered on the $N_2$-th consecutive frame in which clusters of at least $N_1$ connected motion vectors are located inside the virtual polygon.

Once a vehicle is detected, morphological operations, such as closing, opening, filling etc., can be performed on the binary image of the active motion blocks.

Step 5) Determine if a moving vehicle is detected in the virtual target area, classify the detected vehicle into one of bus or other non-bus vehicle categories. The vehicle class may be embedded in the compressed video stream in the form of metadata. For example, see U.S. patent application Ser. No. 13/914,752, filed Jun. 11, 2013, by Bulan et al., entitled "METHOD AND SYSTEMS OF CLASSIFYING A VEHICLE USING MOTION VECTORS".

Once a vehicle is detected in the region of interest, this process classifies the detected vehicle into one of two classes, including a bus or other non-bus vehicle. Vehicle classification can be implemented in many ways. Some examples of these algorithms are listed below:

Based on the geometric attributes, e.g., area, length, height, width, eccentricity, combinations thereof, etc., of a cluster of detected motion blocks associated with a detected vehicle on the image plane;

Estimating the physical length of the detected vehicle using a camera calibration technique which maps pixel coordinates to real-world length units;

A relatively straightforward method for vehicle classification is based on the area of a cluster of active motion blocks. The area of buses is typically much larger than the area of other non-bus vehicles on the image plane. Based on the binary image showing the active motion blocks, the area of a detected blob S can be calculated as:

$$S = \sum_x \sum_y A(x, y)$$

where A is the frame-sized binary mask output from the preceding module and x and y are the pixel coordinates. The calculated blob area is then compared with a predetermined threshold value $T_1$ to distinguish buses from other non-bus vehicles. Note that the predetermined threshold value $T_1$ depends on a specific camera configuration, geometry and parameters, e.g., camera resolution, and can be set at the camera installation/set-up before initializing the algorithm.

Figure 16:
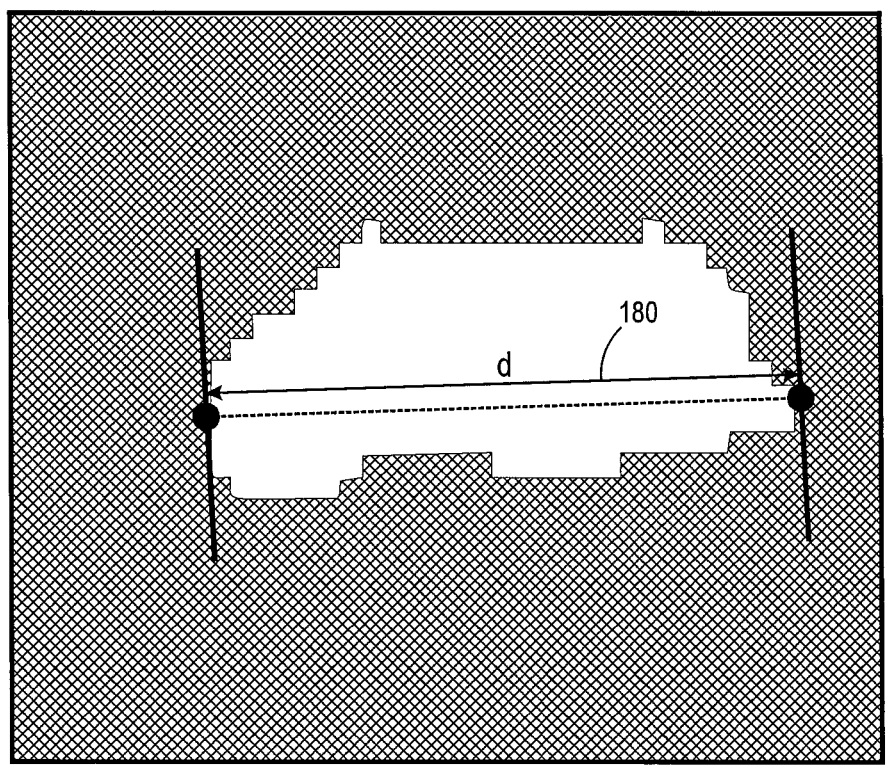
FIG. 16 illustrates the classification of a vehicle according to an exemplary embodiment of this disclosure by estimating the length of a vehicle detected in a region of interest using a cluster of active motion blocks.

Another way to perform vehicle classification is by estimating the physical length d of a detected vehicle. This can be achieved by first determining the start and end points of the cluster of active motion blocks. A line is drawn through each of the start and end point perpendicular to the street direction on the image plane. The line that joins the start and end points is then projected onto the line perpendicular to the lines that pass through the start and end points. The length of a vehicle is then estimated as the length of the projected line. This approach is illustrated in FIG. 16. The physical length of the projected line 180 can be estimated through a calibration process, which maps pixel coordinates into real-life coordinates. For example, see "A flexible new technique for camera calibration" by Z. Zhang. The estimated length d is then compared with a predefined threshold $T_2$. Alternatively, the threshold can be learned via the analysis of historical data or via supervised training methods. A vehicle is classified as a bus if the estimated length is larger than the threshold.

Step 6) If the detected vehicle is a non-bus vehicle, e.g., a car, track the vehicle to determine if it is making a right turn.

Once a detected vehicle has been classified as a non-bus vehicle, a tracker is initialized to track the detected non-bus vehicle across the frames. Tracking detected non-bus vehicles can be implemented in one or more of several possible ways, for example:

Estimating the centroid of the cluster of active motion vectors corresponding to a non-bus vehicle at each frame and tracking the centroid across the frames.

Finding a salient feature or set of features from the cluster of active motion vectors of a detected non-bus vehicle and tracking the feature(s) across the frames.

Note that there are also several other tracking algorithms available, e.g., mean shift tracking, particle filtering etc., and using spatial characteristics of an object of interest including color histogram, texture etc., for visual tracking. These methods typically require decompressing the entire video and operate on the decompressed video. However, the tracking algorithms provided herein operate on the calculated compression motion vectors and hence, do not require a full decompression of the video, thereby providing computational efficiency.

Figure 17:
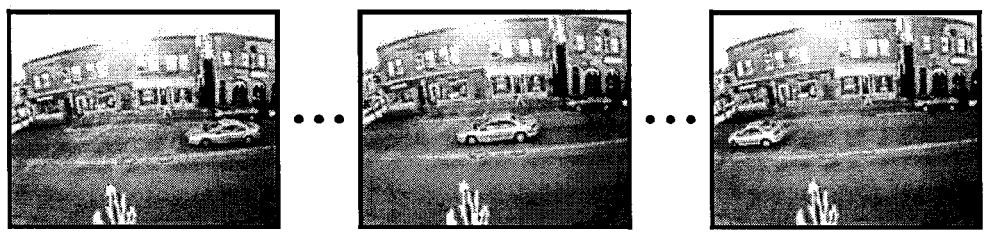
FIGS. 17-19 illustrate vehicle tracking in the compressed domain according to an exemplary embodiment of this disclosure.
Figure 18:
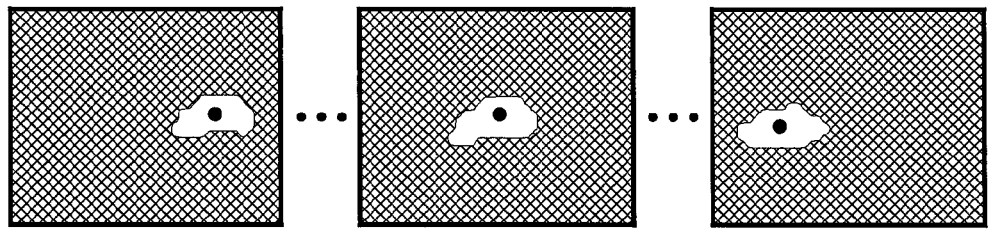
Figure 19:
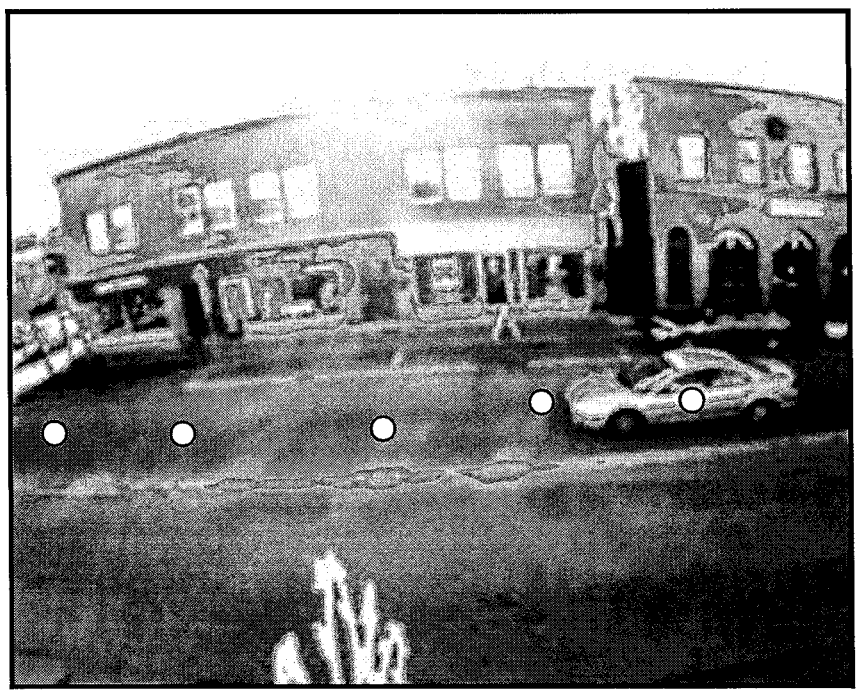

Centroid tracking is illustrated in FIGS. 17-19 where the images in FIG. 17 show time instances of a non-bus vehicle, i.e., a car, passing across a scene being monitored. The images in FIG. 18 are the corresponding active motion vectors, i.e., compression type, at each time instance shown in FIG. 17. The black dot inside a blob shows the centroid of the blob where the centroid of a motion blob can be estimated as:

$$\bar{x} = \frac{\Sigma A(x, y)x}{\Sigma A(x, y)}, \quad \bar{y} = \frac{\Sigma A(x, y)y}{\Sigma A(x, y)}$$

where $(\bar{x}, \bar{y})$ are the coordinates of the blob centroid, (x,y) are the coordinates of the pixels in the blob and A is the binary image values indicating active motion blocks. The image in FIG. 19 shows all the calculated centroids at different time instances on an image. Once the centroid at each frame is calculated the trajectory of the non-bus vehicle can be estimated by interpolating the location of the estimated centroids, i.e., black dots. The trajectory can be also smoothed out to mitigate the impact of outliers in the estimated centroids.

Another way to perform tracking is finding a salient feature from a non-bus vehicle's associated active vector cluster and tracking it across frames. Tracking the spatial location of the selected feature across time enables tracking the non-bus vehicle. While specific knowledge about the characteristics of the non-bus vehicle is not available without performing full frame decompression, the spatial characteristics of the active motion clusters associated with a non-bus vehicle in motion provide clues regarding the appearance of the non-bus vehicle. For example, approximate information regarding the location of the roofline and tires of the non-bus vehicle can be extracted from the active motion vector field from FIG. 10, albeit at a lower resolution than the native resolution of the video frames due to the subsampling effects of the motion vector computation from block matching. Alternatively, an approach similar to that provided in U.S. patent application Ser. No. 13/463,769, filed May 3, 2012, by Fan et al., entitled "TIRE DETECTION FOR ACCURATE VEHICLE SPEED ESTIMATION" may be implemented. In this approach, a binary template with the approximate appearance of a tire in the active motion vector field space is created and correlated with the active motion blob. The location at which the correlation reaches its largest value is assumed to be the approximate location of the tire. Since this operation is performed in a subsampled, binary space, it is extremely fast. However, its accuracy is limited by the size of the motion blocks: the smaller the motion blocks, the potentially better the localization accuracy.

Step 7) If a violation is detected, provide a signal of violation. The relevant information about the violation event may be embedded in the compressed video stream in the form of metadata.

A signal of violation can be any of a number of useful notifications. For example, a warning light can be triggered to alert a driver of their violation. Also, notification can be sent by some means to law enforcement or violation processing authorities.

Embedding the violation information directly into the video is a useful method of recording the infraction incident. The ability to include metadata of various types is a key element in MPEG4 and H264. This feature can provide additional computational savings as the compression standards make it possible to parse a compressed video stream without actually decoding the video/audio content. Embedded information may include date and time of the violation, as well as other information related to the violation.

Step 8) (Optional) Frames that capture the start, middle or end of the violation event can be encoded as reference frames to facilitate future searches or rapid retrieval of evidentiary imagery.

The video sequence or still frames within the sequence may be viewed by a person for verification of an incident and this imagery may be useful as legal evidence. Fast retrieval can be enabled by selecting certain frames to be I-frames. For instance, rapid decompression for viewing a video of a non-bus vehicle driving through an intersection while traveling in a bus-only lane may be enabled by selecting an I-frame at the time a vehicle enters the target area.

In this section of the disclosure, provided are test results associated with an implementation of a centroid tracking algorithm using compression type motion vectors to distinguish non-bus vehicles making a right turn at an intersection for bus-lane enforcement.

An image sequence was captured using Vivotek IP8352 surveillance camera on a local road. The captured image sequence had a frame rate of 30 fps and a resolution of 900×720 pixels. The captured image sequence included an instance of an automobile going straight across an intersection and another instance of an automobile making a right turn at the intersection.

Figure 20:
FIGS. 20 and 21 show a calculated trajectory of a moving vehicle crossing an intersection according to an exemplary embodiment of this disclosure.
Figure 21:
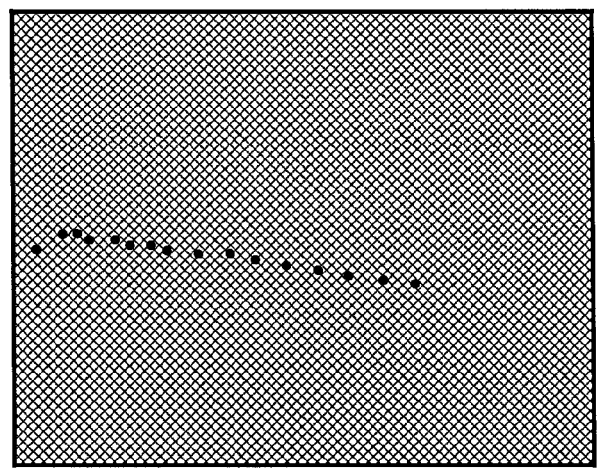
Figure 22:
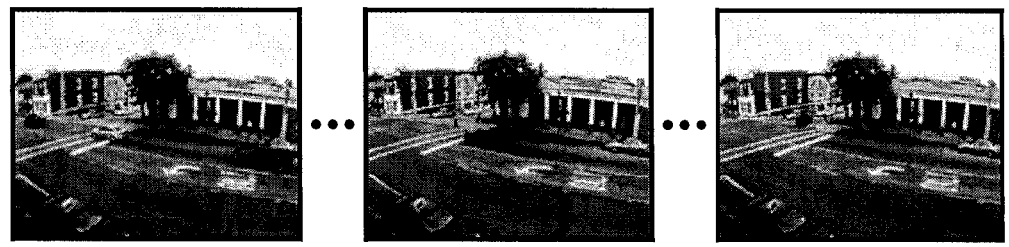
FIGS. 22 and 23 show a calculated trajectory of a moving vehicle making a right turn according to an exemplary embodiment of this disclosure.
Figure 23:
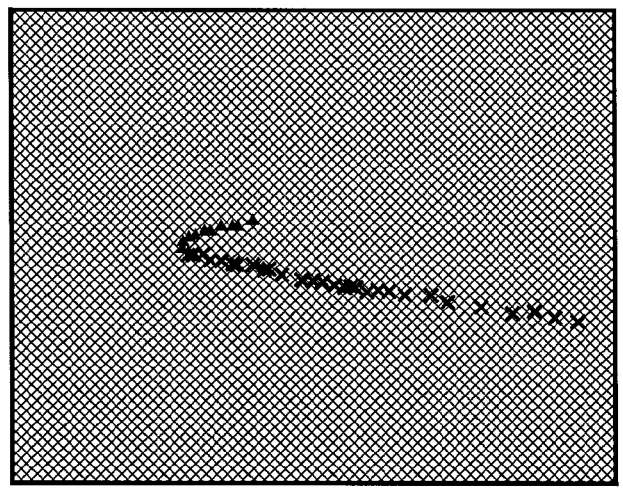

From the captured video, initially, the compression motion vectors were calculated as in typical implementations of MPEG4 and H264. The motion estimation block size was set at 8×8 pixels and the search window size was set at 16×16. Then, a centroid tracking algorithm was executed using the active motion vectors as previously described in Step 6. FIG. 20 shows the image sequence of an automobile going across the intersection. The calculated trajectory of the automobile from the motion vectors is also shown in FIG. 21. Similarly, FIG. 22 shows an image sequence of an automobile making a right turn at the intersection and FIG. 23 shows its calculated trajectory. As shown in FIGS. 21 and 23, a non-bus vehicle driving in the bus lane and making a right turn can be distinguished from a violator from its calculated trajectory. From the calculated trajectory, a violation can be automatically detected by using template matching techniques (see http://en.wikipedia.org/wiki/Template_matching), sparsity based models (see Mo et al., "A Joint Sparsity Model For Video Anomaly Detection", Nov. 7, 2012, 27 pages), and/or standard machine learning algorithms.

This disclosure focuses on detection of bus-lane infractions by calculating the trajectory of a detected non-bus vehicle in a bus-lane. The methods and systems described in this disclosure are also applicable to detection of other traffic violations. For example, vehicles making a U-turn or a left turn where prohibited can be detected by calculating their trajectory from their motion vectors in the same way described herein. A violation is then detected from calculated trajectories using template matching techniques and/or standard machine learning algorithms, as previously discussed. Alternatively, the occurrence of a violation can be determined with the help of virtual trigger areas associated with violations, whose location is determined during system initialization. For example, the trajectory from FIG. 23 may be determined to be associated with an non-infractor by making the determination that the vehicle initially traversed the bus lane (see 'X' marks in trajectory) and later traversed the perpendicular street (see 'Δ' marks in trajectory).

Figure 24:
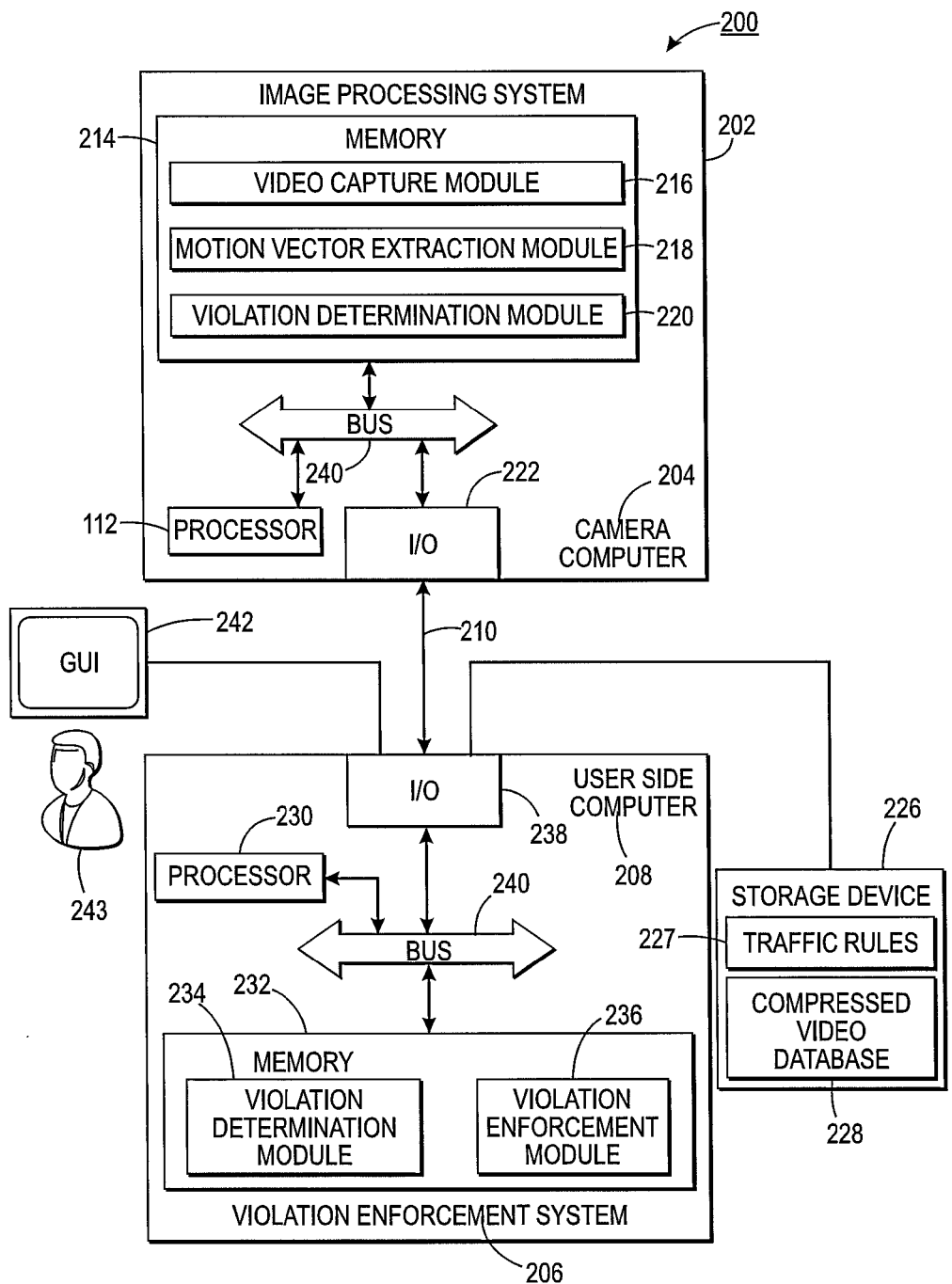
FIG. 24 is a block diagram of a traffic enforcement system according to an exemplary embodiment of this disclosure.

FIG. 24 is a functional block diagram of a traffic enforcement system 200 according to one exemplary embodiment of this disclosure. The system 200 may include an video processing system 202, hosted by a computing device 204, such as a video capture device ("camera") at the traffic region being surveyed, and a violation enforcement system 206, hosted by a user device 208, such as a computer, at a user site, such as at a server, which are linked together by communication links 210, referred to herein as a network. These components are described in greater detail below.

The video processing system 202 illustrated in FIG. 24 includes a processor 212, which controls the overall operation of the video processing system 202 by execution of processing instructions, which are stored in memory 214 connected to the processor 212.

The motion vector generation and cluster tracking processes disclosed herein are performed by the processor 212 according to the instructions stored in memory 214. In particular, memory 214 stores a video capture process module 216, a motion vector extraction process module 218, and a violation determination process module 220.

The illustrated video capture module 216 acquires a series of temporal related image frames including a target area. Each image frame includes pixel data representative of the target area.

The illustrated motion vector extraction module 218 generates one or more motion vectors between two or more of the image frames, wherein the motion vectors are the type produced in the process of compressing the pixel data associated with the two or more image frames. Module 218 associates a cluster of motion vectors with a vehicle and tracks a position of the cluster across the two or more image frames. The module 218 may also count a number of consecutive frames across which the cluster persists. For the number of consecutive frames meeting and exceeding a threshold, module 218 associates the vehicle as an oncoming vehicle.

The illustrated violation determination module 220 uses the tracking results to determine whether the vehicle is violating a lane restriction associated with the target area as previously described. The module 220 transmits a signal of non-compliance and/or the compressed pixel data to the violation enforcement system 206.

The video processing system 202 also includes one or more communication interfaces (I/O), such as network interfaces 222 for communicating with external devices, such as the user device 208. The various hardware components 212, 214, 222 of the video processing system 202 may all be connected by a bus 240.

With continued reference to FIG. 24, the video processing system 202 includes a storage device 226 that is part of or in communication with the video processing system 202. In one embodiment, the video processing system 202 can be in communication with a server (not shown) that hosts storage device 226, for storing traffic rules 227 and/or a compressed video database 228. The server may, for example, process previously compressed data stored in the database.

The video processing system 202 of the traffic enforcement system 200 is communicatively linked with the violation enforcement system 206 via link 210. The violation enforcement system 206 includes a processor 230 and memory 232, and/or has access to a storage device such as storage device 226, for storing software process modules executable by the processor 230. Memory 232 stores software instructions for implementing optional user-side parts of an exemplary method described herein. In particular, the instructions can include a violation determination module 234, which can acquire the compressed video data from the video processing system 202 and decompress the data for determining whether the vehicle has violated a lane restriction. Module 234 can associate the vehicle as not complying with a lane restriction and generate a notice of noncompliance. A violation enforcement module 236 can process the decompressed data to generate information, such as license plate number and vehicle model information, etc., for providing to a user and/or for issuing a ticket. The violation enforcement system 206 further includes a communication interface (I/O) 238 including hardware and/or software suitable for providing wired or wireless data communication with the video processing system 202. The memory 232, processor 230, and communication interface 238 are communicatively linked by a bus 240.

With continued reference to FIG. 24, the user device 208 of the violation enforcement system 206 is communicatively linked to a user interface device (GUI) 242 via a wired and/or wireless link. In various embodiments, the user interface device 242 may include one or more of a display device, for displaying information to users, such as a video and/or an image frame showing the violating vehicle for a user 243, such as a law enforcement officer or agency, to review. The user interface 242 can further include a user input device, such as a keyboard or touch or writable screen, for inputting instructions and/or receiving a validation and/or correction provided by the user, and/or a cursor control device, such as a mouse, trackball, or the like, for communicating user input information and command selections to the processor 230. Specifically, the user interface device 242 includes at least one of an input device and an output device, both of which include hardware, and which are communicatively linked with the violation enforcement system 206 via wired and/or wireless link(s).

The memory 214, 226, 232, may represent any type of tangible computer readable medium such as random access memory (RAM), read only memory (ROM), magnetic disk or tape, optical disk, flash memory, or holographic memory. In one embodiment, the memory 214, 226, 232 may each comprise a combination of random access memory and read only memory. The digital processors 212, 230 can each be variously embodied, such as by a single core processor, a dual core processor (or more generally by a multiple core processor), a digital processor and cooperating math coprocessor, a digital controller, or the like. The digital processors 212, 230 in addition to controlling the operation of the respective video processing system 202 or violation enforcement system 206, executes instructions stored in memory 214, 232 for performing the parts of the method outlined below.

The software modules as used herein, are intended to encompass any collection or set of instructions executable by the video processing system 202 or violation enforcement system 206 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 222, 238 may include, for example, a modem, a router, a cable, and and/or Ethernet port, etc.

As will be appreciated, while two computing devices 204, 208 are illustrated by way of example, the system 200 may be hosted by fewer or more linked computing devices. Each computing device may include, for example, a camera, server computer, desktop, laptop, or tablet computer, smartphone or any other computing device capable of implementing the method described herein.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of estimating a trajectory of a moving vehicle captured with an image capturing device and determining if the moving vehicle is moving in one of a permitted manner and an unpermitted manner associated with movement of restricted vehicles, the image capturing device oriented to include a field of view spanning a vehicle detection target region, the method comprising:
   a) processing a first set of compression type motion vectors associated with a plurality of frames captured with the image capturing device, the first set of motion vectors including a cluster of motion vectors representative of the moving vehicle detected within a virtual target area associated with the vehicle detection target region at a first location;
   b) classifying the moving vehicle detected as one of a plurality of vehicle categories based on one or more geometric attributes associated with the cluster of motion vectors, the plurality of categories associated with restricted vehicle types and non-restricted vehicle types, and the geometric attributes including one or more of area, length, height, width and eccentricity;
   c) if the moving vehicle detected is categorized as a restricted vehicle type, processing a second set of compression type motion vectors associated with the plurality of frames captured with the image capturing device, the second set of motion vectors including a cluster of motion vectors representative of the moving vehicle detected within the virtual target area associated with the vehicle detection target region at a second location different from the first location;
   d) generating a trajectory of the moving vehicle detected within the virtual target area associated with the vehicle detection target region using the first set of motion vectors associated with the first location and the second set of motion vectors associated with the second location; and
   e) processing the generated trajectory of the moving vehicle detected to determine if the moving vehicle is moving in one of the permitted manner and the unpermitted manner.

2. The computer implemented method according to claim 1, wherein the permitted manner and unpermitted manner are associated with motor vehicle lane restrictions.

3. The computer implemented method according to claim 2, further comprising:
  step b) classifying the moving vehicle as one or more of a relatively large size vehicle, a relatively small size vehicle, a truck, a bus, a non-bus vehicle, a passenger vehicle and a motor cycle, and
  step e) analyzes the trajectory of the moving vehicle detected to determine if the moving vehicle detected is moving in one of a permitted manner and an unpermitted manner associated with motor vehicle lane restrictions associated with the moving vehicle classification.

4. The computer implemented method according to claim 2, further comprising:
  step b) classifying the moving vehicle as one of a bus and a non-bus vehicle; and
  step e) analyzing the trajectory of the moving vehicle detected to determine if the moving vehicle detected is moving in one of a permitted manner and unpermitted manner associated with motor vehicle lane restrictions associated with the moving vehicle classification,
  wherein the motor vehicle lane restriction permits only moving buses and other moving non-bus vehicle classifications if the other moving non-bus vehicle turns right from the bus lane.

5. The computer implemented method according to claim 1, wherein step d) compares the detected trajectory with a plurality of predefined patterns to determine if the moving vehicle is moving in one of a permitted manner and an unpermitted manner.

6. The computer implemented method according to claim 1, further comprising:
  f) generating a violation signal if the moving vehicle detected is moving in an unpermitted manner.

7. The computer implemented method according to claim 1, wherein the image capturing device is one of a visible light video camera, infrared video camera, thermal video camera and satellite imaging video camera.

8. The computer implemented method according to claim 1, wherein, prior to step a), the method comprises:
  generating a compressed video stream of video frames captured with the image capturing device, the compressed video stream including compression type motion vectors subsequently processed in steps a) and c).

9. The computer implemented method according to claim 1, wherein step a) and step c) extract a first set of compression type motion vectors and second set of compression type motion vectors, respectively, from a compressed video stream including a moving vehicle captured with the image capturing device.

10. An image processing system comprising:
  an image capturing device oriented to include a field of view spanning a vehicle detection target region, and
  an image processor operatively associated with the image capturing device, the image processor configured to perform a method of estimating a trajectory of a moving vehicle captured with the image capturing device and determining if the moving vehicle is moving in one of a permitted manner and an unpermitted manner associated with movement of restricted vehicles, the method comprising:
  a) processing a first set of compression type motion vectors associated with a plurality of frames captured with the image capturing device, the first set of motion vectors including a cluster of motion vectors representative of the moving vehicle detected within a virtual target area associated with the vehicle detection target region at a first location;
  b) classifying the moving vehicle detected as one of a plurality of vehicle categories based on one or more geometric attributes associated with the cluster of motion vectors, the plurality of categories associated with restricted vehicle types and non-restricted vehicle types, and the geometric attributes including one or more of area, length, height, width and eccentricity;
  c) if the moving vehicle detected is categorized as a restricted vehicle type, processing a second set of compression type motion vectors associated with the plurality of frames captured with the image capturing device, the second set of motion vectors including a cluster of motion vectors representative of the moving vehicle detected within the virtual target area associated with the vehicle detection target region at a second location different from the first location;
  d) generating a trajectory of the moving vehicle detected within the virtual target area associated with the vehicle detection target region using the first set of motion vectors associated with the first location and the second set of motion vectors associated with the second location; and
  e) processing the generated trajectory of the moving vehicle detected to determine if the moving vehicle is moving in one of the permitted manner and the unpermitted manner.

11. The imaging processing system according to claim 10, wherein the permitted manner and unpermitted manner are associated with motor vehicle lane restrictions.

12. The image processing system according to claim 11, the method further comprising:
  step b) classifying the moving vehicle as one or more of a relatively large size vehicle, a relatively small size vehicle, a truck, a bus, a non-bus vehicle, a passenger vehicle and a motor cycle, and
  step e) analyzes the trajectory of the moving vehicle detected to determine if the moving vehicle detected and associated moving vehicle classification is moving in one of a permitted manner and an unpermitted manner associated with motor vehicle lane restrictions associated with the moving vehicle classification.

13. The image processing system according to claim 12, wherein the motor vehicle lane restriction permits only moving buses and other moving non-bus vehicle classifications if the other moving non-bus vehicle turns right from the bus lane.

14. The image processing system according to claim 10, wherein step e) compares the trajectory with a plurality of predefined patterns to determine if the moving vehicle detected is moving in one of a permitted manner and an unpermitted manner.

15. The image processing system according to claim 10, the method further comprising:
  f) generating a violation signal if the moving vehicle detected is moving in an unpermitted manner.

16. The image processing system according to claim 10, wherein the image capturing device is one of a visible light video camera, infrared video camera, thermal video camera and satellite imaging video camera.

17. The image processing system according to claim 10, wherein, prior to step a), the method comprises:
  generating a compressed video stream of video frames captured with the image capturing device, the compressed video stream including compression type motion vectors subsequently acquired in steps a) and c).

18. The image processing system according to claim 10, wherein step a) and step c) extract a first set of compression type motion vectors and second set of compression type motion vectors, respectively, from a compressed video stream including a moving vehicle captured with the image capturing device.

19. A computer implemented method of detecting a moving vehicle violation of a motor vehicle lane restriction, the moving vehicle captured with an image capturing device and the image capturing device oriented to include a field of view spanning a vehicle detection target region associated with movement of restricted vehicles, the method comprising:
- a) processing compressed video of a moving vehicle captured with the image capturing device, the compressed video including compression type motion vectors representing movement of the moving vehicle detected within a virtual target area associated with the vehicle detection target region;
- b) classifying the moving vehicle detected as one or more of a large size vehicle, a relatively small size vehicle, a truck, a bus, a non-bus vehicle, a passenger vehicle and a motorcycle based on geometric attributes associated with the compression type motion vectors;
- c) estimating a trajectory of the detected moving vehicle based on a track of the detected moving vehicle represented as a plurality of temporal spaced clusters of compression type motion vectors associated with the detected moving vehicle within the virtual target area associated with the vehicle detection target region; and
- d) analyzing the detected moving vehicle classification and the estimated trajectory to determine if the moving vehicle is in violation of the motor vehicle lane restriction.

20. The computer implemented method according to claim 19, wherein the motor vehicle lane restriction permits only moving buses and other moving non-bus vehicle classifications if the other moving non-bus vehicle turns right from the bus lane.

21. The computer implemented method according to claim 19, wherein step d) compares the estimated trajectory with a plurality of predefined patterns to determine if the detected moving vehicle is in violation of the motor vehicle lane restriction.

22. The computer implemented method according to claim 19, further comprising:
- e) generating a violation signal if the detected moving vehicle is in violation of the motor vehicle lane restriction.

23. The computer implemented method according to claim 19, wherein prior to step a), the method comprises:
- generating a compressed video stream of video frames captured with the image capturing device, the compressed video stream including compression type motion vectors subsequently acquired in step a).

* * * * *